(12) United States Patent
Kans

(10) Patent No.: US 12,507,753 B1
(45) Date of Patent: Dec. 30, 2025

(54) EYEGLASS SUPPORTING HEADSET

(71) Applicant: Lainie Kans, Plano, TX (US)

(72) Inventor: Lainie Kans, Plano, TX (US)

(*) Notice: Subject to any disclaimer, the term of this patent is extended or adjusted under 35 U.S.C. 154(b) by 0 days.

(21) Appl. No.: 18/385,939

(22) Filed: Nov. 1, 2023

Related U.S. Application Data

(60) Provisional application No. 63/431,711, filed on Dec. 11, 2022.

(51) Int. Cl.
*A42B 1/247* (2021.01)
*G02C 3/02* (2006.01)

(52) U.S. Cl.
CPC .............. *A42B 1/247* (2013.01); *G02C 3/02* (2013.01)

(58) Field of Classification Search
CPC ............ A42B 1/247; A42B 3/185; G02C 3/02
See application file for complete search history.

(56) References Cited

U.S. PATENT DOCUMENTS

| | | | | |
|---|---|---|---|---|
| 2,004,701 A | * | 6/1935 | Livengood | G02C 3/02 2/10 |
| 2,654,089 A | * | 10/1953 | Springer | A42B 1/247 2/10 |
| 4,636,048 A | * | 1/1987 | Jones | A42B 1/247 351/155 |
| 4,781,451 A | * | 11/1988 | McAllen | G02C 3/02 351/155 |
| 4,951,316 A | * | 8/1990 | Moody | A42B 1/247 2/10 |
| 5,533,207 A | * | 7/1996 | Diaz | G02C 3/02 2/10 |
| 5,720,040 A | * | 2/1998 | Simone | A42B 1/247 2/10 |
| 6,959,989 B2 | * | 11/2005 | Holm | A42B 3/185 351/158 |
| 7,172,284 B1 | * | 2/2007 | Sasaki | A42B 1/247 351/158 |
| 8,245,320 B2 | * | 8/2012 | Provost | A42B 3/185 2/442 |
| 10,935,811 B2 | * | 3/2021 | Asemani | F16M 13/04 |
| 2014/0013480 A1 | * | 1/2014 | Treger | A42B 1/247 2/10 |
| 2022/0155592 A1 | * | 5/2022 | Cummings | H04N 7/181 |

* cited by examiner

*Primary Examiner* — F Griffin Hall
(74) *Attorney, Agent, or Firm* — Kenneth L. Tolar

(57) ABSTRACT

A headset for securing eyeglasses to a wearer without applying pressure to the wearer's face, nose, or ears includes a support structure worn on a user's head with a plurality of length-adjustable clamps secured thereto. A distal end of each clamp includes a receptacle that is dimensioned and configured to firmly snap onto either the nose bridge or temple of an eyeglass frame. Accordingly, the support structure suspends eyeglasses from a wearer's head while preventing contact with the ears, nose, or face.

3 Claims, 1 Drawing Sheet

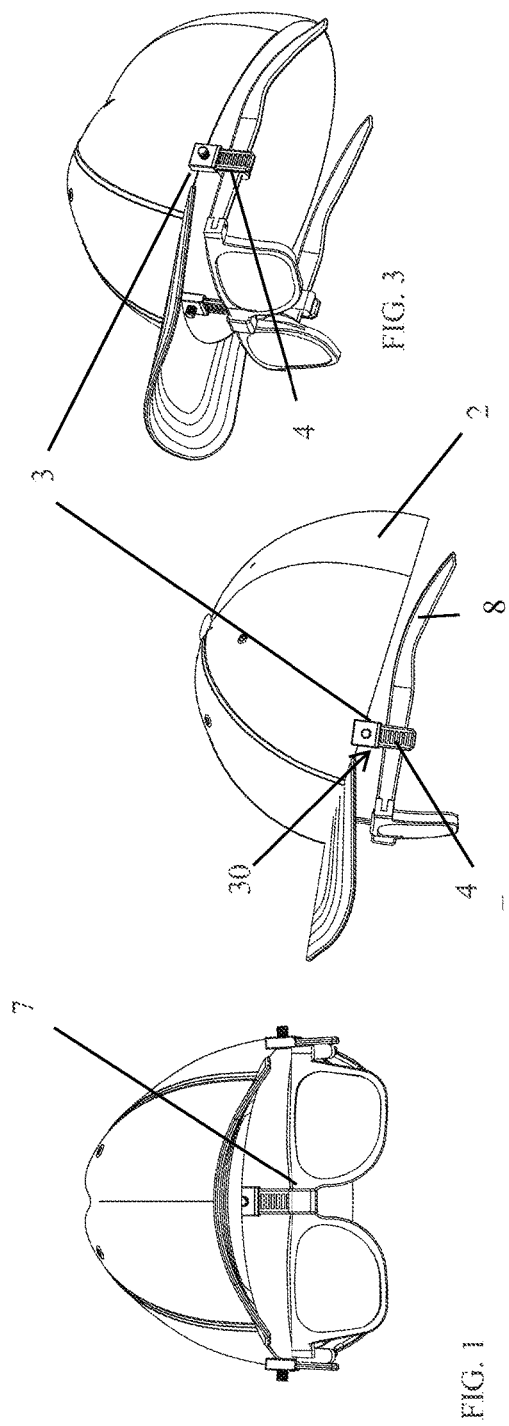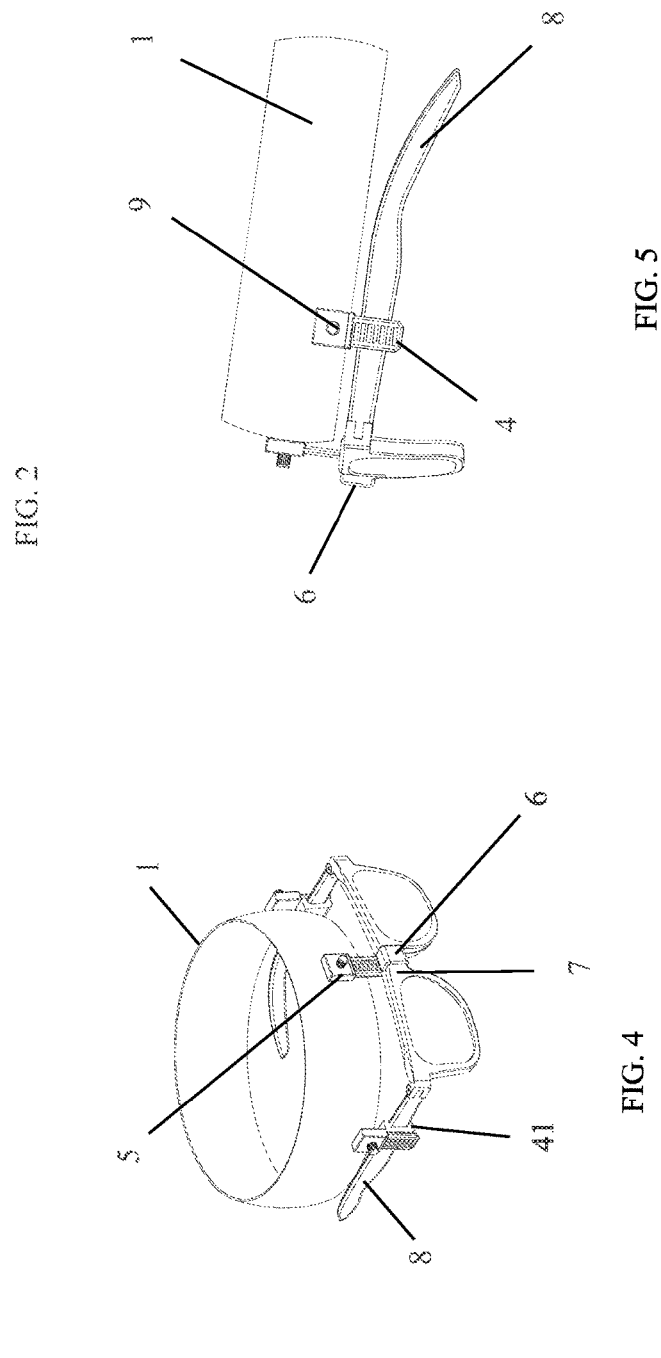

EYEGLASS SUPPORTING HEADSET

CROSS REFERENCE TO RELATED APPLICATIONS

This application claims priority of provisional application No. 63/431,711 filed on Dec. 11, 2022, the specification of which is incorporated herein by reference.

BACKGROUND OF THE INVENTION

The present invention relates to an eyeglass supporting headset that prevents pressure from being applied to a wearer's nose, ears, and face.

DESCRIPTION OF THE PRIOR ART

Many people routinely wear eyeglasses to correct vision or to protect the eyes from sunlight exposure or debris intrusion. Eyeglasses include a pair of spaced lens frames with a bridge therebetween for supporting the eyeglasses on a wearer's nose. A temple extends from an outer edge of each lens frame to further support the eyeglasses atop the wearer's ears. However, wearing glasses can be extremely uncomfortable for those with certain skin conditions and other medical issues due to the pressure exerted on the nose, ears, and temples. As a result, a wearer may forego glasses thereby sacrificing sun protection, vision correction, and overall personal safety.

Accordingly, there is currently a need for a means of securing eyeglasses to a wearer that does not exert undue pressure on a wearer's eye, nose, or face. The present invention addresses this need by providing a headset that suspends eyeglasses in front of a wearer's face.

SUMMARY OF THE INVENTION

Disclosed herein is a headset for securing eyeglasses to a wearer without applying pressure to the wearer's face, nose, or ears. The headset includes a support structure worn on a user's head with a plurality of length-adjustable clamps secured thereto. A distal end of each clamp includes a receptacle that is dimensioned and configured to firmly snap onto either the nose bridge or temple of an eyeglass frame. Accordingly, the headset suspends eyeglasses from the support structure while preventing contact with the ears, nose, or face.

It is therefore an object of the disclosed device to provide a headset that eliminates contact to a wearer's face, nose, and ears.

It is therefore another object of the disclosed device to provide an eyeglass-supporting headset that is length adjustable.

It is yet another object of the disclosed device to provide an eyeglass-supporting headset that minimizes irritation to a wearer's face.

Other objects, features, and advantages of the present invention will become readily apparent from the following detailed description of the preferred embodiment when considered with the attached drawings and the appended claims.

BRIEF DESCRIPTION OF THE DRAWINGS

FIG. 1 is a front, plan view of the headset according to the present invention.

FIG. 2 is a side view of the headset.

FIG. 3 is a perspective view of the headset.

FIG. 4 is a perspective view of a second embodiment of the headset.

FIG. 5 is a side view of the embodiment of FIG. 4.

DESCRIPTION OF THE PREFERRED EMBODIMENT

Disclosed herein is a headset for securing eyeglasses to a wearer without applying pressure to the wearer's face, nose, or ears. The headset includes a support structure for resting on wearer's head, such as a standalone headband 1 or the lower edge of a cap crown 2. A plurality of clamps 3 are removably attached to the support structure using conventional fasteners. Each clamp includes a telescoping spine 30 having a slotted lower section 4 received within an upper section 5. A distal end of the lower section 4 includes a receptacle that is dimensioned and configured to firmly snap onto a given portion of an eyeglass frame. In one embodiment, the receptacle 6 on a central clamp is configured to releasably mate with the bridge 7 while the receptacle 41 on two side clamps is configured to releasably mate with each temple 8.

A knob 9 positioned on the upper section of each spline adjusts the length of the clamp member according to the wearer's face configuration. When the knob is rotated, an internal engagement member extends or retracts the lower section. Accordingly, the headset suspends eyeglasses from the support structure while preventing contact with the ears, nose, or face.

The above-described device is not limited to the exact details of construction and enumeration of parts provided herein. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An eyeglass supporting headwear comprising:
   a support structure configured to be positioned on a wearer's head;
   a plurality of length-adjustable clamps attached to said support structure, wherein said length-adjustable clamps each include a telescoping spine having a slotted first section received within a second section;
   one of said plurality of length-adjustable clamps including a receptacle that is dimensioned and configured to firmly snap onto an eyeglass bridge;
   another of said plurality of length-adjustable clamps including a receptacle configured to releasably mate with an eyeglass temple;
   a knob positioned on the first section of said spine that, when rotated, causes an engagement member to extend and retract the second section.

2. The eyeglass supporting headwear according to claim 1 wherein said support structure is a cap.

3. The eyeglass supporting headwear according to claim 1 wherein said support structure is a headband.

* * * * *